United States Patent
Schanz

(10) Patent No.: US 10,532,416 B2
(45) Date of Patent: Jan. 14, 2020

(54) MACHINING TOOL FOR DEBURRING BOREHOLES

(71) Applicant: Guehring KG, Albstadt (DE)

(72) Inventor: Gerhard Schanz, Burladingen (DE)

(73) Assignee: Guehring KG, Albstadt (DE)

( * ) Notice: Subject to any disclaimer, the term of this patent is extended or adjusted under 35 U.S.C. 154(b) by 0 days.

(21) Appl. No.: 15/475,833

(22) Filed: Mar. 31, 2017

(65) Prior Publication Data

US 2017/0297125 A1 Oct. 19, 2017

(30) Foreign Application Priority Data

Apr. 6, 2016 (DE) .................. 10 2016 205 657

(51) Int. Cl.
*B23D 77/00* (2006.01)
*B23B 51/10* (2006.01)

(52) U.S. Cl.
CPC .......... *B23D 77/006* (2013.01); *B23B 51/101* (2013.01); *B23B 51/105* (2013.01);
(Continued)

(58) Field of Classification Search
CPC .............. B23D 77/006; B23D 2277/60; B23D 2277/085; B23D 2277/08; B23D 2277/16; B23D 77/003; B23B 51/06; B23B 51/105; B23B 51/101; B23B 2231/0244; B23B 2220/08; B23B 2270/06; B23B 2250/12; Y10T 408/45; Y10T 408/455; B23C 5/28; B23C 2250/00; B23C 2250/04; B23C 2250/08; B23C 2250/12
See application file for complete search history.

(56) References Cited

U.S. PATENT DOCUMENTS 1,189,727 A * 7/1916 Oakley ............... B23B 51/0486
408/59
1,304,981 A * 5/1919 Hoagland ............... B23B 51/06
408/57
(Continued)

FOREIGN PATENT DOCUMENTS

DE 1 167 302 10/1964
DE 19728157 A1 * 1/1999 ............. B23D 77/02
(Continued)

*Primary Examiner* — Sunil K Singh
*Assistant Examiner* — Michael Vitale
(74) *Attorney, Agent, or Firm* — Burr & Brown, PLLC

(57) ABSTRACT

A machining tool for deburring boreholes, which lead laterally into a recess, comprising: a shaft; a cutting head with at least one circumferential cutting blade associated with a chip groove and having a cutting edge extending, at least in sections, in an axial direction, and which can perform a cutting process by virtue of relative movement between the tool and a workpiece, and which lies on a virtual cylindrical rotation surface; and at least one cutting-blade-free and chip-groove-free surface area; at least one fluid channel closed on the cutting head side, extending through the shaft into the cutting head; and at least one branch channel with an outlet opening. The outlet opening is in a dynamic pressure active surface radially set back relative to the virtual rotation surface, and is larger than a flow cross-sectional area of the at least one branch channel at the outlet opening.

21 Claims, 7 Drawing Sheets

(52) U.S. Cl.
CPC ....... *B23B 2220/08* (2013.01); *B23B 2250/12* (2013.01); *B23B 2270/24* (2013.01); *B23D 2277/44* (2013.01); *B23D 2277/60* (2013.01); *B23D 2277/72* (2013.01); *Y10T 408/45* (2015.01)

(56) References Cited

U.S. PATENT DOCUMENTS

| | | | | |
|---|---|---|---|---|
| 7,290,965 | B2 * | 11/2007 | Gaiser | B23B 51/105 407/53 |
| 7,824,135 | B2 * | 11/2010 | Radkowitsch | B23B 41/02 408/1 R |
| 2007/0104551 | A1 * | 5/2007 | Gaiser | B23B 31/107 409/132 |

FOREIGN PATENT DOCUMENTS

| | | | | |
|---|---|---|---|---|
| DE | 197 28 157 | | 7/1999 | |
| DE | 103 21 670 | | 12/2004 | |
| DE | 10 2008 056 782 | | 5/2010 | |
| DE | 102008056782 | A1 * | 5/2010 | ........... B23B 51/105 |
| SU | 732087 | A1 * | 5/1980 | |
| SU | 1685628 | A1 * | 10/1991 | |
| SU | 1815009 | A1 * | 5/1993 | |

* cited by examiner

MACHINING TOOL FOR DEBURRING BOREHOLES

The invention concerns a machining tool, in particular a rotationally driven machining tool for deburring boreholes which lead laterally into, for example, a cylindrical recess.

The deburring of boreholes which lead laterally into, for example, a cylindrical recess poses a significant problem. Such boreholes are indispensable for example in the field of automotive technology—in the case of radial boreholes which lead into the central axial borehole of the cam shaft or crank shaft—and in mobile hydraulics, if for example the issue is the control of a valve piston received in a central borehole via control ports in the form of radial channels. Because as a rule the radial channels have to be produced in one drilling operation, it is not possible, even with a specifically designed drilling tool, to reliably avoid a burr or residual chip remaining in an area in which the radial channel leads into the central borehole recess.

Irrespective of the fact that this chip influences the flow conditions and with that compromises the adjustment and function of the corresponding hydraulic control, the particular problem arises that if such a chip is not removed before starting the operation, it will be torn off after a certain period of time and cause serious damage to the system.

Thus, as control technology becomes ever more sensitive, attempts are constantly being made at increasing expense to remove the machining residues from the radial channel outlet as completely as possible. To this end specifically designed work tools have been brought into use, with which the cutting head located on the shaft could be guided with optimum positional accuracy to the chip which is to be removed. However, the high level of precision required has made the manufacturing process significantly more expensive.

A machining tool for deburring such boreholes which achieves this aim with relatively little expense is disclosed for example by DE 103 21 670 A1. This publication shows and describes a rotationally driven work tool for deburring openings, e.g. boreholes. The work tool has a cutting head located on a shaft with at least one cutting edge, which extends, at least in sections, in an axial direction. A radial force producing device is integrated into the work tool with which the cutting head, during its rotary motion, may be radially deflected in a controlled manner. The radial force producing device has an interior flow medium channel from which at least one branch channel extends, which leads to an outer circumferential surface of the work tool in the area of the cutting head. The flow medium leaving the outlet opening of the at least one branch channel accumulates at the opposite inner wall of the recess thus forming a dynamic pressure between the work tool and the inner wall of the recess which elastically deflects the cutting head in a radial direction.

The work tool mentioned in the aforementioned publication can reliably and faultlessly carry out the deburring process in boreholes which lead laterally into, for example, a cylindrical recess. However, the configuration of the at least one branch channel in the cutting head area requires precise and therefore relatively elaborate machining in order not to damage the cutting edges of the cutting head. In addition, with this work tool the flow medium must be supplied at a relatively high feed pressure in order to generate sufficiently high dynamic pressure and thus a sufficiently high radial force which causes the cutting head to radially deflect.

A further machining tool for deburring the boreholes described above is disclosed by DE 10 2008 056 782 A1. In contrast to DE 103 21 670 A1, the cutting head of the work tool in DE 10 2008 056 782 A1 consists of a cutting blade section and a section without cutting blade, the cross section of which is the shape of a circular segment, with at least two branch channels radially extending from a central flow medium channel leading into the outer circumferential surface of this second section. As with the work tool in DE 103 21 670 A1, the flow medium of the work tool in DE 10 2008 056 782 A1 must also be supplied at a relatively high feed pressure in order to generate sufficiently high dynamic pressure and thus a sufficiently high radial force which causes the cutting head to radially deflect.

Starting with the work tool disclosed in DE 10 2008 056 782 A1, the aim of the invention is therefore to make available a work tool, with which it is possible, without a great deal of effort/cost, to produce a higher radial force at the cutting head and thereby to be able to carry out a very effective but also precise, economical, reliable and faultless deburring process.

This aim may be achieved by a machining tool with the characteristics of independent claim 1. Advantageous further developments are the subject of dependent claims.

A machining tool according the invention, in particular a rotationally driven machining tool, for example a reamer, for deburring boreholes which lead laterally into, for example, a cylindrical recess, has a shaft, a cutting head with at least one circumferential cutting blade which is associated with a chip groove and which has a cutting edge, which extends, at least in sections, in an axial direction, performs a cutting process by virtue of a relative movement between work tool and work piece, and lies on a virtually cylindrical rotation surface the diameter of which corresponds with the nominal diameter of the machining tool, and at least one cutting-blade-free and chip-groove-free surface area on the side of the rotation surface, at least one closed fluid channel on the cutting head side, and at least one branch channel extending out from the fluid channel with an outlet opening located in a cutting-blade-free and chip-groove-free surface area. In contrast to the state of the art technology discussed in the introduction, in the machining tool according to the invention, the outlet opening located in a cutting-blade-free and chip-groove-free surface area lies in a radially set back dynamic pressure active surface located opposite the virtual rotation surface of the cutting head which is larger than a flow cross-sectional area of the at least one branch channel at the outlet opening.

The cutting head may thus be divided in the circumferential direction into a cutting blade section and a surface area which has neither in cutting blade nor a chip groove. The cutting blade section has the at least one cutting blade which defines a cutting edge and, in the usual way, a chipping and free surface, and which is associated with a chip groove. The cutting-blade-free and chip-groove-free surface area by contrast has neither a cutting blade nor a chip groove.

The cutting-blade-free and chip-groove-free surface area which contains the dynamic pressure active surface, makes it possible to distribute the fluid leaving the outlet opening of the at least one branch channel in the area or volume between the work tool and the inner wall of the recess which is to be processed. The dynamic pressure being built up by the fluid leaving the outlet opening of the at least one branch channel in this area or volume acts on the dynamic pressure active surface thus producing a radial force which effects a deflection of the cutting head in the direction of the at least one cutting blade.

The dynamic pressure active surface is a random plane or uneven, for example convex or concave, surface, located in the cutting-blade-free and chip-groove-free surface area of the cutting head, and is radially set back in relation to the virtual rotation surface of the cutting head, i.e. lies radially inside the virtual rotation surface, which defines the nominal diameter of the work tool. The dynamic pressure active surface is therefore a surface on which during deburring of a borehole and while fluid is supplied to the work tool, the dynamic pressure is effective, which builds up between the cutting head and the opposite inner wall of the recess. The dynamic pressure active surface lies opposite, advantageously at least largely diametrically opposite, the at least one cutting blade. Where there are a number of cutting blades the dynamic pressure active surface lies opposite, advantageously at least largely diametrically opposite, the centre of the section having a cutting blade, the cross-section of which is segment shaped and in which a number of cutting blades are located.

Because the dynamic pressure active surface is radially set back in relation to the virtual rotation surface of the cutting head, the surface area of the dynamic pressure active surface which is responsible for producing a radial force on the work tool is larger than the flow cross-sectional area at the outlet opening of the at least one branch channel. Provided that there is a sufficient supply of fluid into the work tool, which is easily achieved using machine tool technology, the dynamic fluid pressure building up between the cutting head of the work tool and the opposite inner wall of the recess produces a radial force dependant on the size of the dynamic pressure active surface which deflects the cutting head radially in the direction of the at least one cutting blade.

As a result of the radial deflection, the at least one cutting edge of the cutting blade of the work tool which performs a tumbling motion, moves largely on a circular path around the longitudinal or rotary axis of the work tool. It has been shown that it is possible in this way to remove burrs or, where necessary, the existing residual chips, in a careful but also reproducible and reliable manner, without running the risk of further residual chip build up elsewhere. A number of cutting blades may be added as a matter of course, in order to reduce the necessary processing time on the work piece.

The machining tool according to the invention is therefore characterised in that the dynamic pressure active surface is designed so that the sum of the dynamic pressure force produced between the cutting head and the inner wall of the recess can radially deflect the shaft in the direction of the at least one cutting blade. As already mentioned, a precondition for this is that the amount of fluid supplied is sufficiently large and a static flow state can be produced in the area or volume between the cutting head, in particular the dynamic pressure active surface of the cutting-blade-free and chip-groove-free surface area, and the opposite inner wall of the recess. This precondition is easily fulfilled by a suitably controlled fluid supply device provided on the side of the machine tool.

By equipping the machining tool with a dynamic pressure active surface a greater radial force is achieved for the same fluid pressure in comparison with state of the art technology, and the deburring process can be carried out very effectively and efficiently. A further advantage is gained with the machining tool according to the invention in that a large radial force can be produced with very little effort and for this reason one and the same machining tool can be used to deburr boreholes of varying diameter size.

The method by which the dynamic pressure active surface is created on the cutting head is immaterial in this context. For example in the work tool disclosed in DE 103 21 670 A1, a cutting-blade-free and chip-groove-free surface area or a dynamic pressure active surface may simply be created in that, in an area of the cutting head in which there is at least one outlet opening of a branch channel, a surface area is created, by for example an at least partial grinding or similar of one or a number of cutting blades, in that an axially and/or circumferentially limited part of one or more cutting blades are removed. The cutting-blade-free and chip-groove-free surface area produced in this way thus has a dynamic pressure active surface in which the outlet opening of the at least one branch channel is located and which had a larger surface area than the flow cross-sectional surface of the at least one branch channel.

Equally, with the work tool disclosed in DE 10 2008 056 782 A1, a cutting-blade-free and chip-groove-free surface area or a dynamic pressure active surface may simply be created in that in the section without a cutting blade of the cutting head a (cutting-blade-free and chip-groove-free) surface area is created by grinding or similar, which in relation to the virtual rotation surface of the cutting head, in which the cutting edges of the cutting head are located, is radially set back and in which the outlet opening of at least one branch channel is located. The (cutting-blade-free and chip-groove-free) surface area created in this way thus forms a dynamic pressure active surface according to the invention.

The at least one fluid channel runs preferably along the longitudinal or rotary axis of the machining tool and extends from a clamping section of the shaft into the cutting head. In this case the fluid channel is particularly easily formed as a central borehole, for example blind hole, in the work tool. The cutting head is closed at the end located in tool feed direction, so that no fluid can leak out of the fluid channel there. Instead, the fluid leaves the machining tool via the at least one branch channel, the outlet opening of which is located in the cutting-blade-free and chip-groove-free surface area. The machining tool according to the invention may however also have a number of fluid channels in the shaft, which for example run parallel.

The at least one branch channel runs largely in a radial direction, preferably at right angles to the fluid channel. In this case, the at least one branch channel may be easily formed as a radial borehole. The machining tool may however also have a number of branch channels in the cutting-blade-free and chip-groove-free surface area, the outlet opening of which are located in the cutting-blade-free and chip-groove-free surface area. Having a number of branch channels in the work tool allows the supplied fluid to spread over the dynamic pressure active surface more rapidly, making a more effective and quicker processing possible. The course of the branch channels from the fluid channel to the outlet openings in the cutting-blade-free and chip-groove-free surface area may basically take any shape or form.

It has been shown that the fluid itself may be a gaseous medium, for example air or an aerosol. Preferably however, a fluid cooling lubricant commonly used for machining will be used.

Experiments have shown that the radial force produced by the dynamic pressure is greater the greater the dynamic pressure active surface is in relation to the flow cross-sectional surface of the outlet opening of the at least one branch channel. The dynamic pressure active surface may be arranged as axially parallel or at an angle to the longitudinal axis of the machining tool. The dynamic pressure active surface may be in the form of a concave, convex or level surface, but also of a trough shaped hollow, for example an axial groove. The level surface may be produced by surface grinding or surface milling. It is also possible that a number of variously aligned dynamic pressure active surfaces are arranged within the cutting-blade-free and chip-groove-free surface area.

The dynamic pressure active surface may have the same axial length as the cutting head, thus extending in an axial direction over the whole length of the cutting head. However, the dynamic pressure active surface of the machining tool may also be smaller in axial length than the cutting head. In this case, the dynamic pressure active surface may end at an axial distance in front of the face and/or shaft side end of the cutting head. In particular, the dynamic pressure active surface may end in a defined gap in front of the front and rear ends of the cutting head. This creates a pocket shaped space between the cutting head and the inner wall of the recess which is to be processed. The axial outflow of the fluid along the cutting-blade-free and chip-groove-free surface area or the dynamic pressure active surface of the machining tool is thereby obstructed and the dynamic pressure is raised.

The part of the shaft of the machining tool which does not serve to clamp the work tool may have a tapered diameter in relation to the cutting head. This provides for a greater flexibility of the work tool and makes the radial deflection of the cutting head easier.

The cutting head of the machining tool may have a tap point known as such at least on the side facing away from the shaft. This further facilitates the insertion of the machining tool. If there is a tap point on both sides of the cutting head, the machining tool may also be used to deburr the interior outlet of a borehole, into which the machining tool is inserted.

The cutting head may, as in DE 10 2008 056 782 A1, divided in the circumferential direction into a cutting blade section and a cutting-blade-free and a chip-groove-free section which forms the cutting-blade-free and chip-groove-free surface area. In this case, the cutting-blade-free and chip-groove-free surface area according to the invention may lie inside the cutting-blade-free and chip-groove-free surface area section.

The machining tool may be realised as a standing cutting work tool, for example as a turning tool, or as a chipping tool rotating around a longitudinal axis as axis of rotation, for example as a milling, drilling, in particular deep-hole drilling, straight-grooved drill or spiral drilling tool, or as a reamer.

For the selection of material for the machining tool there are practically no restrictions. The machining tool may be either completely, or at least in the area of the cutting head, made from a high-strength material such as, for example, wear-resistant steel, high-speed steel (HSS, HSSE, HSSEBM), hard metal, ceramic or cermet, wherein suitable coatings may also be applied.

In a preferred embodiment the machining tool is a reamer and the dynamic pressure active surface is in the form of a level surface. Further, the work tool has a fluid channel running along the longitudinal axis of the machining tool, a cutting head the diameter of which is greater than the diameter of the shaft, as well as a cutting blade section like the example in DE 10 2008 056 782 A1, with three cutting blades with straight grooves. This embodiment proves very advantageous in view of the manufacturing cost and the radial force which it is possible to produce.

Various embodiments of a machining tool according to the invention are explained below using the attached drawings.

FIGS. 1 to 7 show a preferred first embodiment of a rotationally driven machining tool 10 according to the invention which is formed, by way of example, as a reamer.

Figure 1:
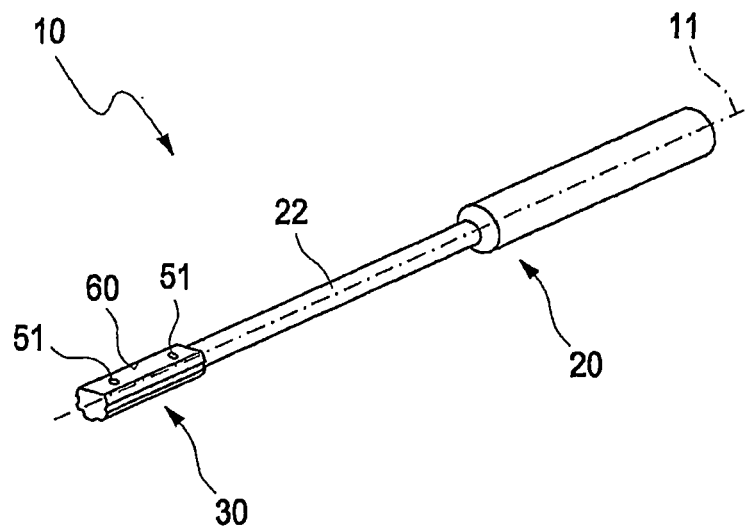
FIG. 1 shows a perspective view of a first embodiment of a machining tool.

The work tool 10 has a shaft 20, a cutting head 30, a fluid channel 21 and two branch channels 50.

Figure 2:
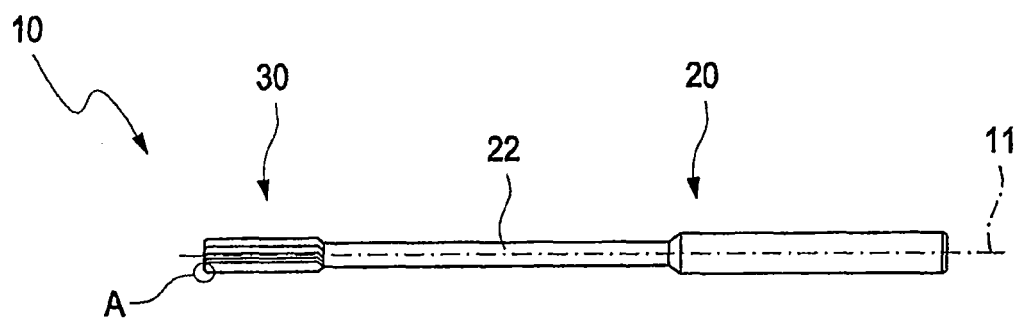
FIG. 2 shows a schematic side view of the machining tool in FIG. 1.
Figure 3:
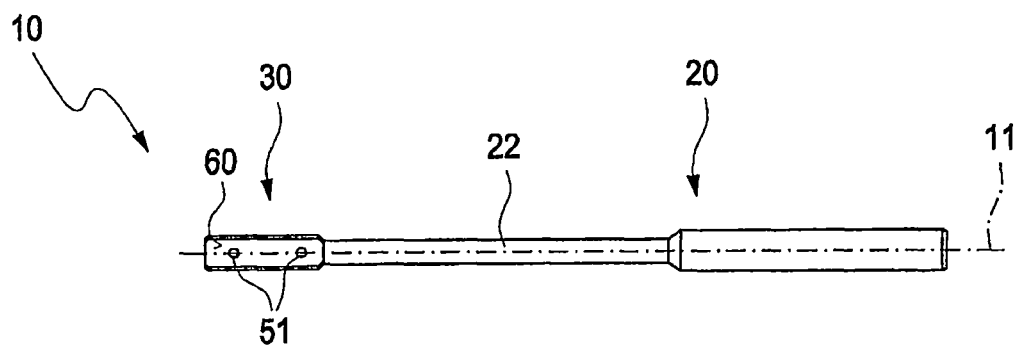
FIG. 3 shows a second schematic side view of the machining tool in FIG. 1.

The shaft 20 serves to fix the work tool in a chuck. FIGS. 1, 2 and 3 show that the diameter of shaft 20 tapers in the direction of the cutting head 30. The tapered longitudinal section 22 of the shaft 20 is smaller in diameter than the nominal diameter of the cutting head 30. The diametrically tapered longitudinal section 22 of the shaft 20 ensures that the work tool 10 is flexible, which facilitates a radial deflection of the cutting head 30.

The cutting head 30 sits axially on the tapered longitudinal section 22 of the shaft 20. The straight-grooved cutting head 30 shown in the embodiment has three cutting blades with three cutting edges 31, which extend in a linear manner in an axial direction, perform a cutting process by virtue of a relative movement between the work tool 10 and the work piece to be processed and which are located on a virtual cylindrical rotation surface 40 (see FIG. 4). The diameter of the virtual cylindrical rotation surface 40 corresponds to the nominal diameter of the cutting head 30 of the work tool 10. Further, the cutting head 30 has a cutting-blade-free and chip-groove-free surface area 32, in which there are no cutting blades and no chip grooves and which therefore does not perform a cutting process.

Furthermore, the work tool 10 has an inner fluid channel 21 closed on the cutting head side, which extends along the longitudinal axis 11 through the shaft 20 into the cutting head 30 and from which two radial branch channels 50 extend out in the cutting head 30 area. The branch channels 50 are arranged so that they lead with an outlet opening 51 into a dynamic pressure active surface 60, which is located within the cutting-blade-free and chip-groove-free surface area 32, as shown in FIG. 4.

In the embodiment shown according to FIGS. 1, 3, 4, 6 and 7, the dynamic pressure active surface 60 is a flat rectangular surface which runs parallel to the longitudinal axis 11 and which is radially set back in relation to the rotation surface 40 of the cutting head 30. The dynamic pressure active surface 60 therefore lies radially inside the virtual rotation surface 40. The radial distance r of the dynamic pressure active surface 60 from the longitudinal axis 11 is smaller than the radius R of the virtual cylindrical rotation surface 40, the diameter of which corresponds to the nominal diameter of the work tool 10. FIGS. 1 and 3 show that the dynamic pressure active surface 60 extends in an axial direction over the whole length of the cutting head 30, and so has the same axial length as the cutting head 30. FIGS. 1 and 3 further show that the dynamic pressure active surface 60 is larger than the sum of the flow cross-sectional surfaces of the branch channels 50 at the outlet openings 51.

Figure 4:
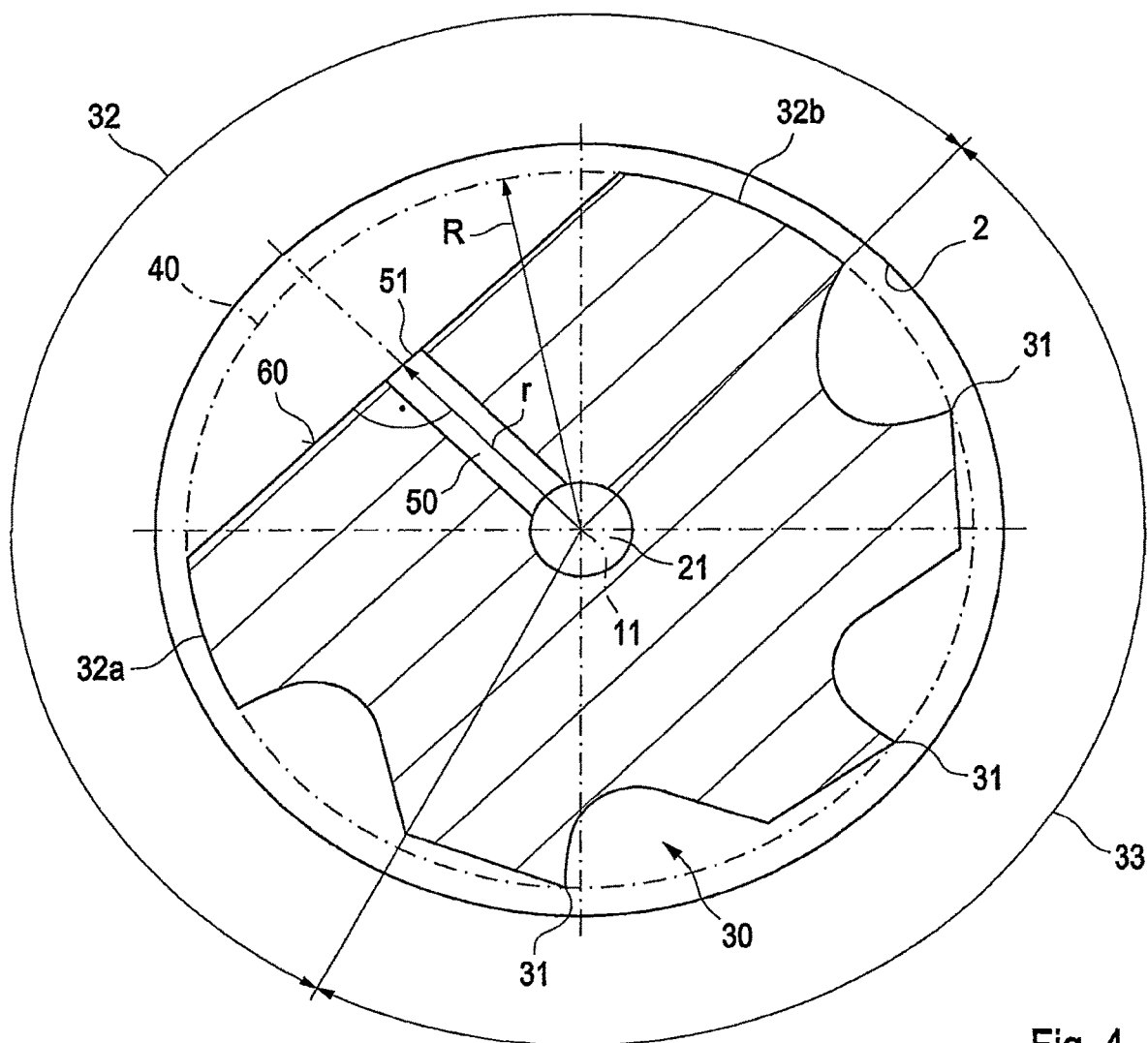
FIG. 4 shows a cross-section view of the cutting head of the machining tool in FIG. 1.
Figure 5:
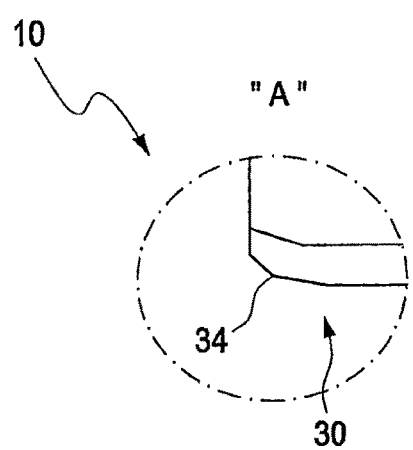
FIG. 5 shows an enlarged detail A from FIG. 2.
Figure 6:
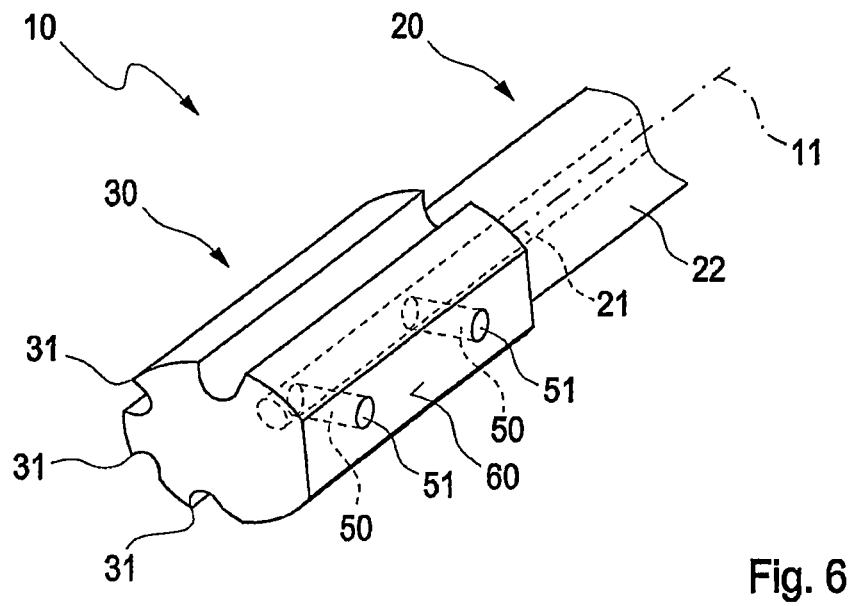
FIG. 6 shows a perspective view of a cutting head of the first embodiment of a machining tool.
Figure 7:
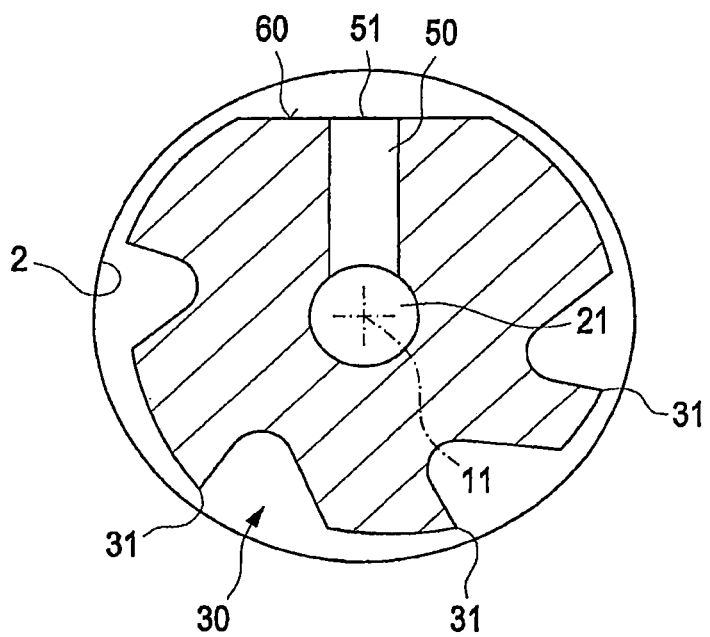
FIG. 7 shows a cross-section view of the cutting head in FIG. 6.

FIG. 4 shows that the dynamic pressure active surface 60 is located, at least largely, opposite the middle of the cross-sectionally segment-shaped cutting blade section 33 in which the cutting blades with cutting edges 31 are arranged. The dynamic pressure active surface 60 is advantageously arranged largely vertically in relation to the angle bisector of the cutting blade section 33 or the segment of the cutting-blade-free and chip-groove-free surface area 32.

In addition, FIG. 4 shows that the outer surface of the cutting-blade-free and chip-groove-free surface area 32 in the embodiment shown features two cylindrical rotation surface sections 32a, 32b, and the dynamic pressure active surface 60.

The cutting-blade-free and chip-groove-free surface area 32 facilitates a spreading over the dynamic pressure active surface 60 of the fluid leaving the outlet openings of the branch channels 50 in the area or volume between the work tool 10 and the opposite inner wall of the recess 2 of a work piece which is to be machined. Assuming there is a sufficient fluid supply into the fluid channel 21, the dynamic pressure of the fluid leaving the branch channels 50 via the outlet openings 51, which is building up in this area or volume, acts on the dynamic pressure active surface 60, producing a radial force which effects a deflection of the cutting head 30 in the direction of the cutting blades with cutting edges 31.

As a result of the radial deflection, the cutting edges 31 of the cutting blades move largely on a circular path around the longitudinal axis 11. It has been shown that it is possible in this way to carefully as well as reproducibly and reliably remove a burr, or if necessary existing chip residue in a borehole 1 which leads laterally into a cylindrical recess 2 without running the risk that further chip residue will occur elsewhere.

Further, the cutting edge 30 of the work tool 10 has a conventional tap point 34 on the side facing away from the shaft 20.

The work tool 10 according to the invention is characterised in that the dynamic pressure active surface 60 is provided such that the sum of the dynamic pressure forces built up in the area of the dynamic pressure active surface 60 between the cutting head 30 and the inner wall of the recess 2, can radially deflect the shaft 20 in the direction of the cutting blades with cutting edges 31. As already mentioned, a precondition for this is that the amount of fluid fed into the fluid channel 21 is sufficiently large to enable a static flow condition to be established in the area or volume between the cutting head 30, in particular the dynamic pressure active surface 60 of the cutting-blade-free and chip-groove-free surface area 32, and the inner wall of the recess 2 located opposite. A sufficiently large fluid supply is easily achieved using machine-tool technology.

Figure 8:
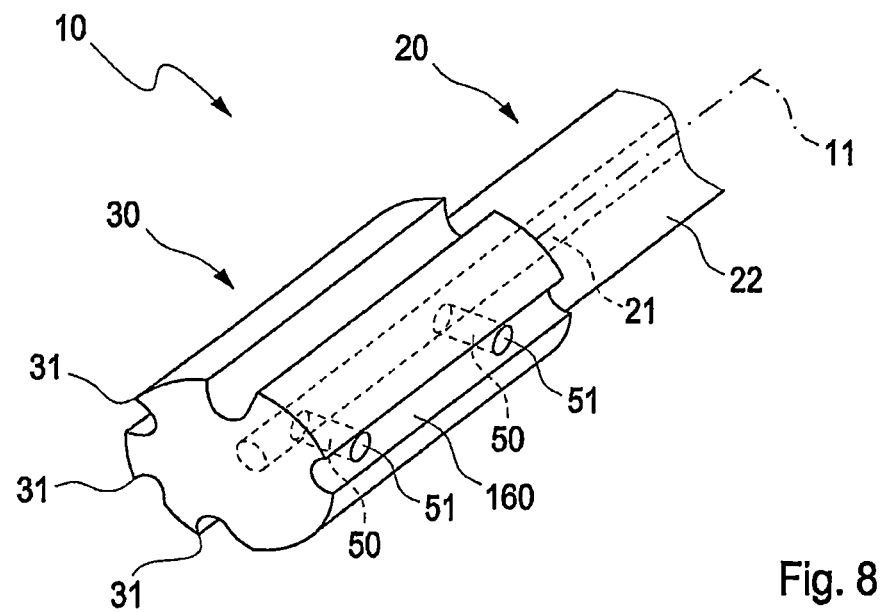
FIG. 8 shows a perspective view of a cutting head of a second embodiment of a machining tool.
Figure 9:
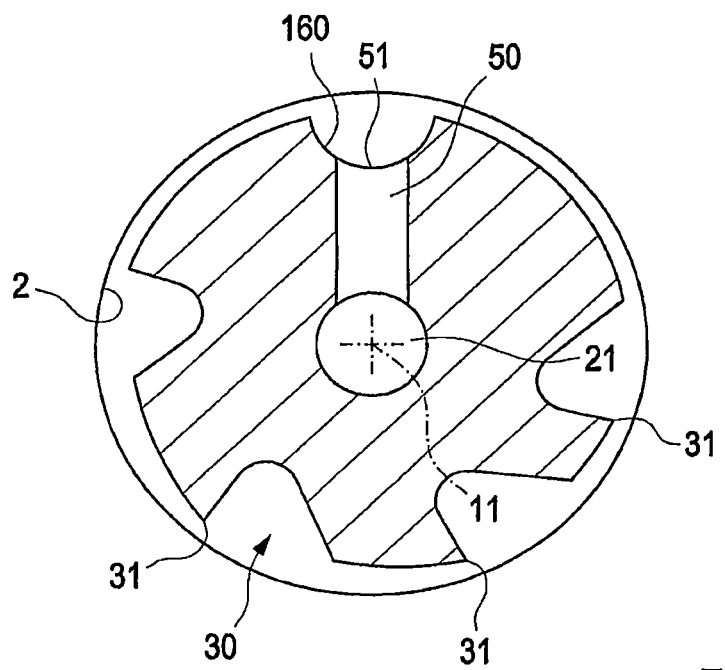
FIG. 9 shows a cross-section view of the cutting head in FIG. 8.

FIGS. 8 and 9 show a second embodiment of a machining tool according to the invention. The second embodiment is only differentiated from the first embodiment by the form of the dynamic pressure active surface 160. In the second embodiment, the dynamic pressure active surface 160 is formed cross-sectionally, in the direction of the branch channel, as a convex axial groove.

Figure 10:
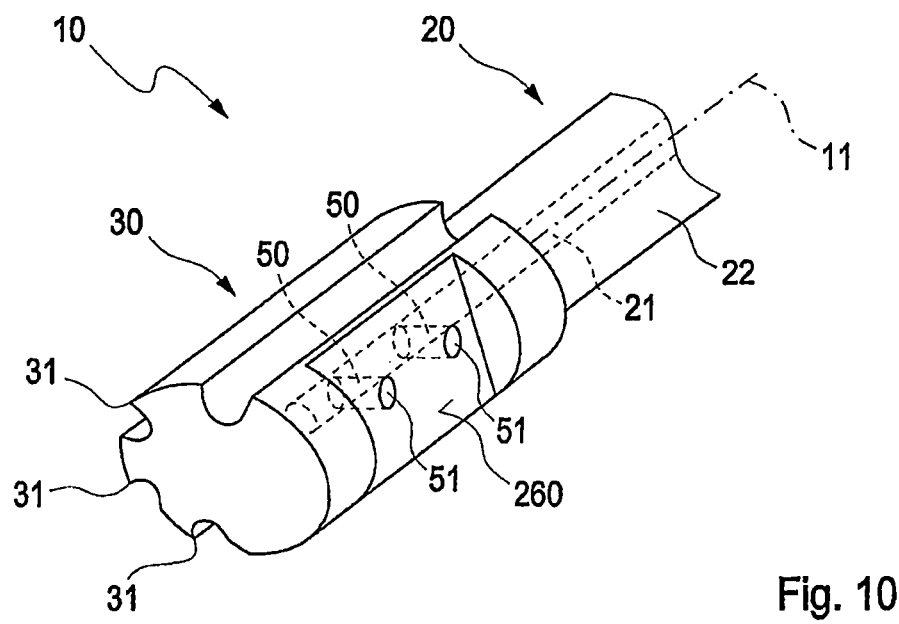
FIG. 10 shows a perspective view of a cutting head of a third embodiment of a machining tool.
Figure 11:
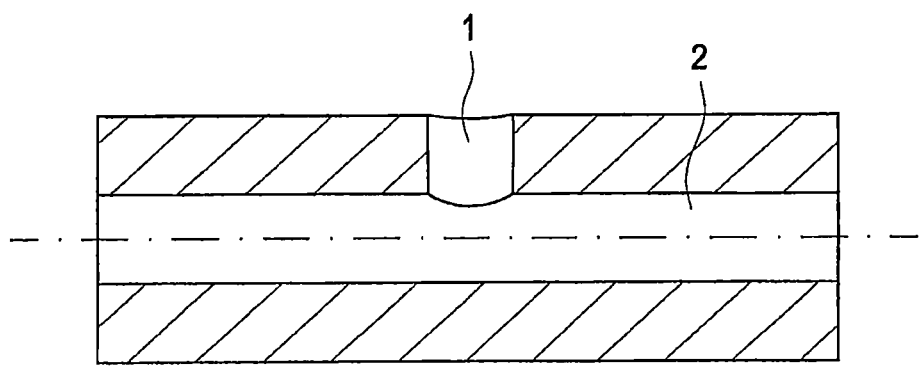
FIG. 11 shows a cross-section view of a borehole leading into a cylindrical recess.

FIG. 10 shows a third embodiment of a machining tool according to the invention. The third embodiment is differentiated from the first embodiment by the length of the dynamic pressure active surface 260. The dynamic pressure active surface 260 has a flat surface as in the first embodiment, but the axial length of the dynamic pressure active surface 260 in the third embodiment is smaller than the axial length of the cutting head 30. The dynamic pressure active surface 260 ends at an axial distance in front of the face and shaft ends of the cutting head 30. In this way a type of pocket-shaped space is created between the cutting head 30 and the inner wall of the recess 2 which is to be machined. This obstructs the axial outflow of the fluid along the cutting-blade-free and chip-groove-free surface area or the dynamic pressure active surface 260 of the machining tool and raises the dynamic pressure.

In the embodiments shown in FIGS. 1 to 10, the dynamic pressure active surface 60 is arranged as axially parallel to the longitudinal axis 11 of the machining tool 10. It may however also be arranged at an angle to the longitudinal axis of the machining tool.

Furthermore, the dynamic pressure active surface may, in contrast to the embodiments shown, have a concave or convex surface.

Figure 12:
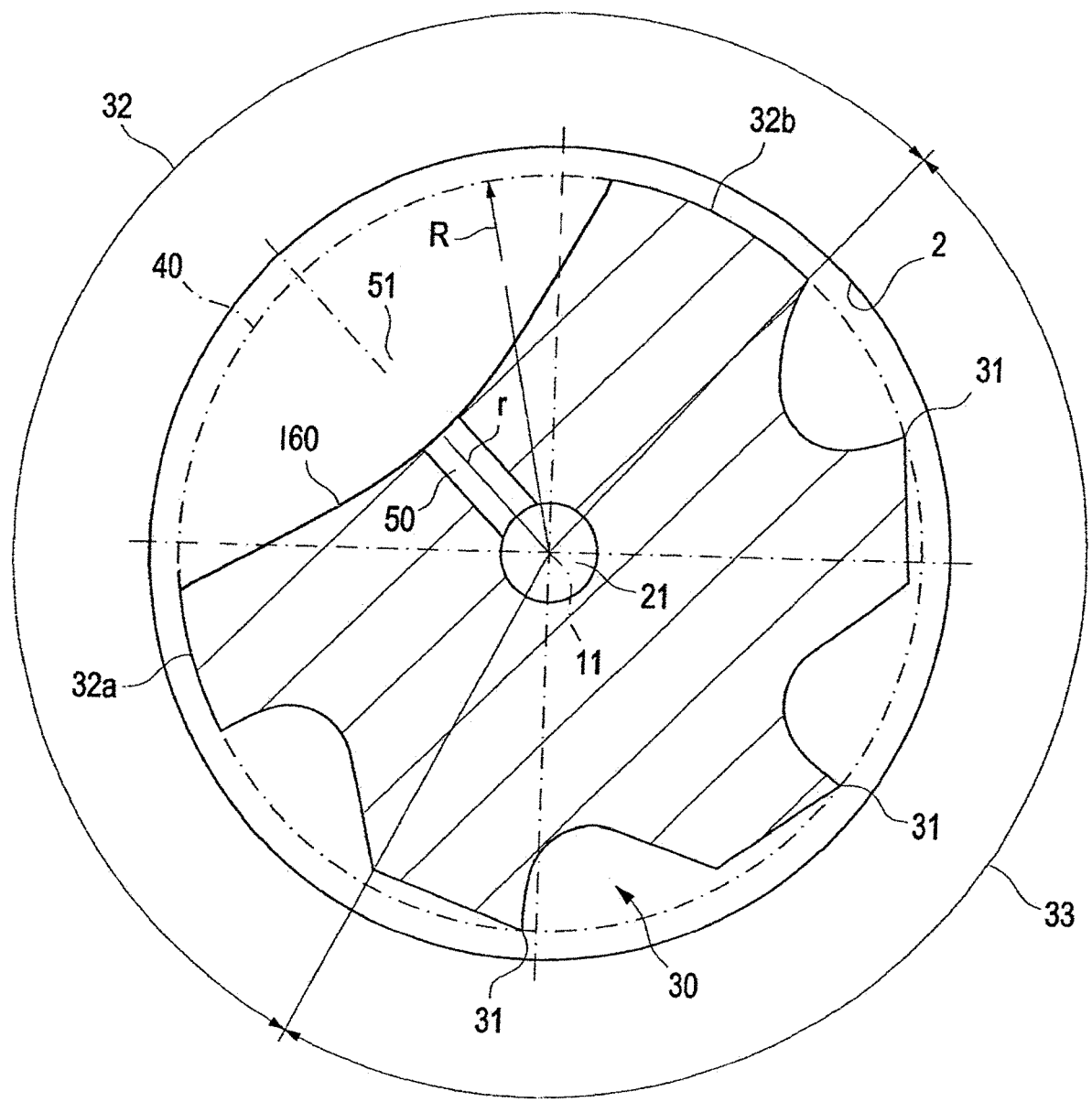
FIG. 12 shows a cross-section view of a cutting head of a fourth embodiment of a machining tool.

FIG. 12 shows a cross-section view of a cutting head that is similar to the cutting head depicted in FIG. 4, except that the in the cutting head depicted in FIG. 12, the dynamic pressure active surface 160 has a concave surface.

It is also possible that a number of variously aligned dynamic pressure active surfaces may be arranged inside the cutting-blade-free and chip-groove-free surface area.

In contrast to the form of the cutting-blade-free and chip-groove-free surface area shown in FIG. 4, the dynamic pressure active surface may be radially further set back whereby the two cylindrical rotation surface sections decrease in size and the dynamic pressure active surface gets bigger. The dynamic pressure active surface may be set back to the extent that the outer surface of the cutting-blade-free and chip-groove-free surface area consists largely only of the dynamic pressure active surface.

Furthermore, there may be more or fewer than three cutting blades arranged in the cutting blade section.

Equally, the machining tool may have more or fewer than two branch channels. The course of the branch channels from the central fluid channel as far as the outlet openings in the cutting-blade-free and chip-groove-free surface area may take fundamentally any form.

Furthermore, the machining tool may have a number of, for example, parallel fluid channels running in the shaft, which each lead to an associated branch channel.

Figure 13:
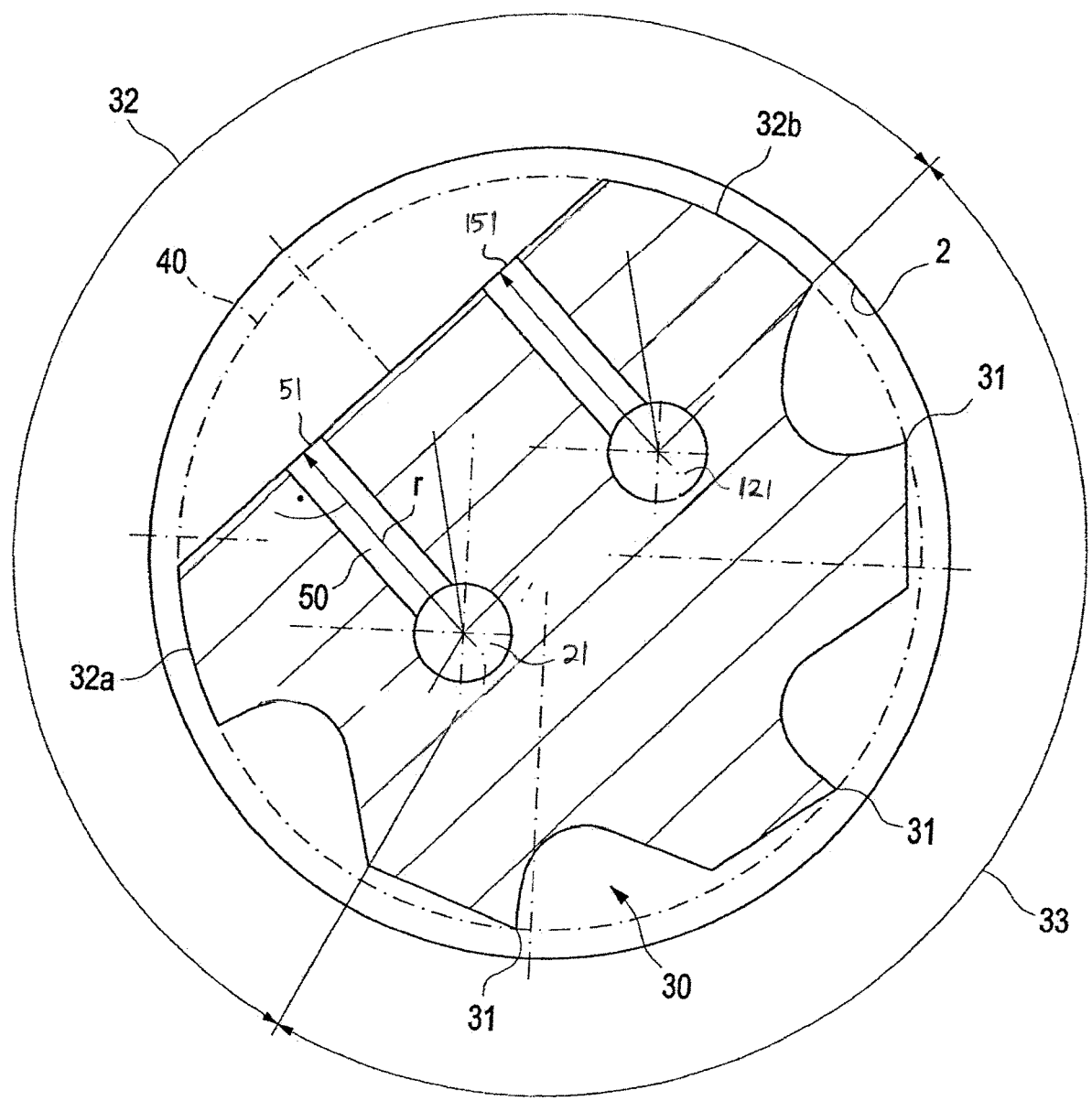
FIG. 13 shows a cross-section view of a cutting head of a fifth embodiment of a machining tool.

FIG. 13 shows a cross-section view of a cutting head that is similar to the cutting head depicted in FIG. 4, except that the in the cutting head depicted in FIG. 13, the tool 10 has a second inner fluid channel 121 closed on the cutting head side, from which a radial branch channel 151 extends.

The machining tool may, in addition to the tap point facing away from the shaft, have another tap point on the side of the cutting head facing towards the shaft, so that the machining tool may also be used for deburring the inner outlet of a recess, into which the machining tool is inserted.

Moreover, the manner in which the dynamic pressure active surface is created on the cutting head is immaterial.

For example, in the work tool disclosed in DE 103 21 670 A1, a cutting-blade-free and chip-groove-free surface area or a dynamic pressure active surface may simply be created by creating a surface area in an area of the cutting head in which at least one branch channel outlet opening is located, by a grinding or degrading process and in which, in an axial direction and/or a circumferential direction, a limited part of or a number of cutting blades are removed. The cutting-blade-free and chip-groove-free surface area obtained in this way thus has a dynamic pressure active surface in which the outlet opening of the at least one branch channel is located and which has a greater surface area than the flow cross-sectional surface of the at least one branch channel. In this case the outer surface of the cutting-blade-free and chip-groove-free surface area may, in contrast to the design shown in FIG. 4, consist only of a dynamic pressure active surface.

In the embodiments shown, the machining tool is realised by way of example as a reamer. It may also however be realised as a standing cutting tool, for example as a turning tool or as a cutting tool rotating around a longitudinal axis as a rotation axis, for example as a milling, drilling, in particular deep-hole drilling, straight-grooved drilling or spiral drilling work tool.

The invention claimed is:

1. A machining/cutting tool, for deburring boreholes that lead laterally into a recess, comprising:
   a shaft having a shaft axis, the tool configured to be rotated about the shaft axis,
   a cutting head having at least a first circumferential cutting blade which comprises a straight groove and which has at least one cutting edge, each cutting edge in the first circumferential cutting blade extending solely in a respective direction that is parallel to the shaft axis, the cutting head being configured to perform a cutting process by virtue of a relative movement between the tool and a work piece, each cutting edge in the first circumferential cutting blade lying on a virtual cylindrical rotation surface, the virtual cylindrical rotation surface having a cylindrical axis that is coaxial with the shaft axis, the virtual cylindrical rotation surface having a diameter that corresponds with a nominal diameter of the machining tool, and the cutting head further having at least one cutting-blade-free and chip-groove-free surface area,
   at least one fluid channel closed on a cutting head side, which extends through the shaft into the cutting head, and
   at least one branch channel emanating from the fluid channel with an outlet opening in the cutting-blade-free and chip-groove-free surface area,
   the outlet opening located in the cutting-blade-free and chip-groove-free surface area in a dynamic pressure active surface which is radially set back in relation to the virtual cylindrical rotation surface of the cutting head and which is larger than a flow cross-sectional area of the at least one branch channel at the outlet opening.

2. The machining/cutting tool according to claim 1, wherein the cutting head has at least two cutting blades with straight grooves.

3. A machining/cutting tool, for deburring boreholes that lead laterally into a recess, comprising:
   a shaft,
   a cutting head with at least one circumferential cutting blade which is associated with a chip groove and which has a cutting edge, which extends, at least in sections, in an axial direction, and which is configured to perform a cutting process by virtue of a relative movement between the tool and a work piece, and lies on a virtual cylindrical rotation surface a diameter of which corresponds with a nominal diameter of the machining tool, and at least one cutting-blade-free and chip-groove-free surface area,
   at least one fluid channel closed on a cutting head side, which extends through the shaft into the cutting head, and
   at least one branch channel emanating from the fluid channel with an outlet opening in the cutting-blade-free and chip-groove-free surface area,
   the outlet opening located in the cutting-blade-free and chip-groove-free surface area in a dynamic pressure active surface which is radially set back in relation to the virtual cylindrical rotation surface of the cutting head and which is larger than a flow cross-sectional area of the at least one branch channel at the outlet opening,
   wherein the cutting head has a multiplicity of cutting blades with straight grooves.

4. The machining/cutting tool according to claim 3, wherein the dynamic pressure active surface is provided such that the total of the dynamic pressure forces produced in the area of the dynamic pressure active surface between the machining tool or the cutting head and the inner wall of the recess, can deflect the shaft in a radial direction.

5. The machining/cutting tool according to claim 3, wherein the dynamic pressure active surface is in the form of a flat surface.

6. The machining/cutting tool according to claim 3, wherein the dynamic pressure active surface is in the form of a concave axial groove.

7. The machining/cutting tool according to claim 3, wherein the dynamic pressure active surface is formed as concave or convex in a direction of the at least one branch channel.

8. The machining/cutting tool according to claim 3, wherein the dynamic pressure active surface runs axially parallel to a longitudinal centre line of the tool.

9. The machining/cutting tool according to claim 3, wherein the dynamic pressure active surface has a smaller axial length than the cutting head.

10. The machining/cutting tool according to claim 9, wherein the dynamic pressure active surface, viewed in a feed direction of the tool, ends at a defined distance from front and rear ends of the cutting head.

11. The machining/cutting tool according to claim 3, wherein the machining tool has two linear branch channels extending out from the at least one fluid channel.

12. The machining/cutting tool according to claim 3, wherein the at least one fluid channel runs along a longitudinal center axis of the machining tool.

13. The machining/cutting tool according to claim 3, wherein a diameter of the cutting head is larger than a diameter of the shaft.

14. The machining/cutting tool according to claim 3, wherein at least two internal fluid channels extend into the cutting shaft and are closed on the cutting head side.

15. The machining/cutting tool according to claim 3, wherein the cutting head has a tap point at least on a side facing away from the shaft.

16. The machining/cutting tool according to claim 3, wherein the machining tool is in the form of a milling or a drilling tool or a reamer.

17. The machining/cutting tool according to claim 3, wherein the cutting head is divided, in a circumferential direction, into a cutting blade section and a cutting-blade-free and chip-groove-free section, which forms the cutting-blade-free and chip-groove-free surface area.

18. The machining/cutting tool according to claim 3, wherein the machining/cutting tool is rotationally driven.

19. The machining/cutting tool according to claim 3, wherein the recess is cylindrical.

20. A machining/cutting tool, for deburring boreholes that lead laterally into a recess, comprising:

- a shaft having a shaft axis the tool configured to be rotated about the shaft axis,
- a cutting head having at least one circumferential cutting blade which comprises a straight groove and which has a cutting edge, which extends, at least in sections, in a first direction that is parallel to the shaft axis, and which is configured to perform a cutting process by virtue of a relative movement between the tool and a work piece, the cutting edge lying on a virtual cylindrical rotation surface, the virtual cylindrical rotation surface having a cylindrical axis that is coaxial with the shaft axis the virtual cylindrical rotation surface having a diameter that corresponds with a nominal diameter of the machining tool, and the cutting head further having at least one cutting-blade-free and chip-groove-free surface area,
- at least one fluid channel closed on a cutting head side, which extends through the shaft into the cutting head, and
- at least one branch channel emanating from the fluid channel with an outlet opening in the cutting-blade-free and chip-groove-free surface area,
- the outlet opening located in the cutting-blade-free and chip-groove-free surface area in a dynamic pressure active surface which is radially set back in relation to the virtual cylindrical rotation surface of the cutting head and which is larger than a flow cross-sectional area of the at least one branch channel at the outlet opening, a length of the dynamic pressure active surface in a direction parallel to the first direction is smaller than a length of the cutting edge in the first direction, the dynamic pressure active surface ending at a distance in the direction parallel to the first direction in front of a face end of the cutting head and in front of a shaft end of the cutting head.

21. The machining/cutting tool according to claim 20, wherein the cutting head has three cutting blades with straight grooves.

* * * * *